United States Patent [19]

Goto

[11] Patent Number: 5,461,722
[45] Date of Patent: Oct. 24, 1995

[54] PARALLEL PROCESSING APPARATUS SUITABLE FOR EXECUTING IN PARALLEL A PLURALITY OF INSTRUCTIONS INCLUDING AT LEAST TWO BRANCH INSTRUCTIONS

[75] Inventor: Tatuhiro Goto, Fuchu, Japan

[73] Assignee: Kabushiki Kaisha Toshiba, Kawasaki, Japan

[21] Appl. No.: 842,208

[22] PCT Filed: Sep. 4, 1991

[86] PCT No.: PCT/JP91/01180

§ 371 Date: Mar. 23, 1992

§ 102(e) Date: Mar. 23, 1992

[30] Foreign Application Priority Data

Sep. 5, 1990 [JP] Japan ..................... 2-233103
Sep. 3, 1991 [JP] Japan ..................... 2-222990

[51] Int. Cl.$^6$ ..................................... G06F 9/00
[52] U.S. Cl. .............. 395/800; 395/375; 364/261.3; 364/261.9; 364/262.9; 364/230; 364/230.1; 364/DIG. 1
[58] Field of Search .............. 395/800, 375; 364/DIG. 1, DIG. 2, 261.3, 261.9, 230, 230.1

[56] References Cited

U.S. PATENT DOCUMENTS 4,833,599  5/1989  Colwell et al. ............. 395/650
4,926,323  5/1990  Baror et al. ............... 395/375
5,121,488  6/1992  Ngai ........................ 395/375

FOREIGN PATENT DOCUMENTS 0244424   2/1990  Japan .
02130635  5/1990  Japan .

Primary Examiner—Eric Coleman
Assistant Examiner—Dzung C. Nguyen
Attorney, Agent, or Firm—Oblon, Spivak, McClelland, Maier & Neustadt

[57] ABSTRACT

A parallel processing apparatus suitable when a plurality of instructions including at least two branch instructions are parallelly executed is disclosed. This invention is provided with a register (31) for holding branch judgment results in pipeline processing units (16-0–16-3). A cancel circuit (32) generates cancel signals for canceling execution of instructions after a branch instruction (objective branch instruction) having the highest priority of branch instructions whose branch conditions are determined to hold true. A priority encoder (33) generates a control signal (C0) for designating a branch target address generated in processing of the objective branch instruction on the basis of the output from the register. An instruction fetch unit (12) prefetches an instruction string to be executed next according to the address designated by the signal (C0).

5 Claims, 9 Drawing Sheets

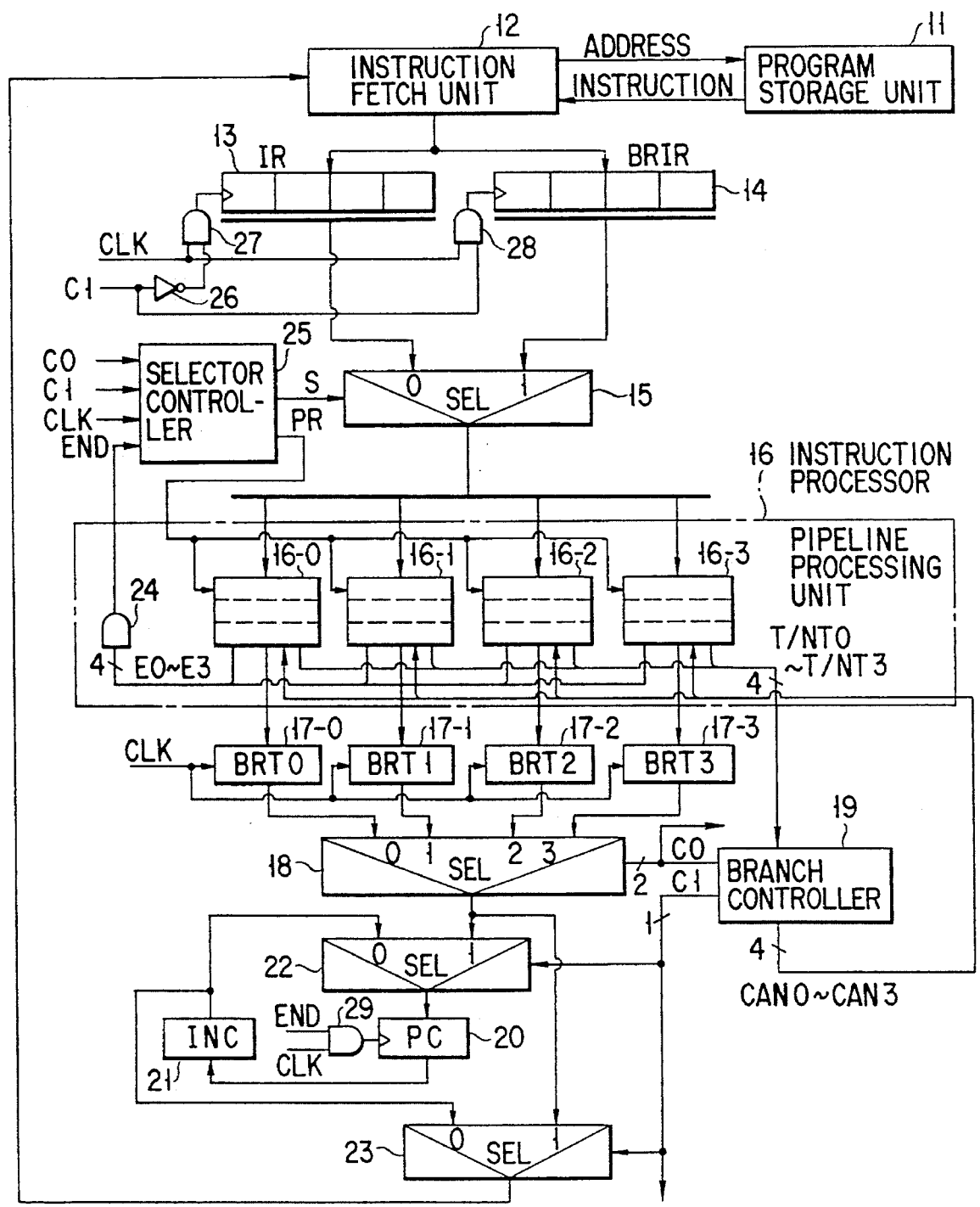
F I G. 1

| OUTPUT FROM REGISTER 31 | CAN0 | CAN1 | CAN2 | CAN3 |
|---|---|---|---|---|
| 0000 | 0 | 0 | 0 | 0 |
| 0001 | 0 | 0 | 0 | 0 |
| 0010 | 0 | 0 | 0 | 1 |
| 0011 | 0 | 0 | 0 | 1 |
| 0100 | 0 | 0 | 1 | 1 |
| 0101 | 0 | 0 | 1 | 1 |
| 0110 | 0 | 0 | 1 | 1 |
| 0111 | 0 | 0 | 1 | 1 |
| 1000 | 0 | 1 | 1 | 1 |
| 1001 | 0 | 1 | 1 | 1 |
| 1010 | 0 | 1 | 1 | 1 |
| 1011 | 0 | 1 | 1 | 1 |
| 1100 | 0 | 1 | 1 | 1 |
| 1101 | 0 | 1 | 1 | 1 |
| 1110 | 0 | 1 | 1 | 1 |
| 1111 | 0 | 1 | 1 | 1 |

| CYCLE | PIPELINE PROCESSING UNIT | | | |
|---|---|---|---|---|
| | 16-0 | 16-1 | 16-2 | 16-3 |
| T0 | ADD | | SUB | BR2 |
| T1 | | BR1 | | |
| T2 | | | | |

| CYCLE | T1 | T2 |
|---|---|---|
| OUTPUT FROM REGISTER 31 | 0001 | 0001 |
| C1 | 1 | 1 |
| C0 | 11 | 11 |
| FC1 | — | 1 |
| FC0 | — | 1 |
| END | 1 | 1 (→0) |
| TM (PR) | 0 | 1 |
| S | 0 | 1 |
| OUTPUTS FROM SEL 22,23 | TAR1 | TAR1 |
| IR 13 | FOUR INSTRUCTIONS NEXT TO BR2 | FOUR INSTRUCTIONS NEXT TO BR2 |
| BRIR 14 | — | FOUR INSTRUCTIONS STARTING AT MP |
| OUTPUT FROM SEL 15 | IR 13 | BRIR 14 |

FIG. 6

| CYCLE | T1 | T2 | T3 |
|---|---|---|---|
| OUTPUT FROM REGISTER 31 | 0001 | 0101 | 0101 |
| CI | 1 | 1 | 1 |
| CO | 11 | 01 | 01 |
| FCI | — | 1 | 1 |
| FCO | — | 11 | 01 |
| END | 1 | 1 | 1 (→0) |
| TM (PR) | 0 | 0 | 1 |
| S | 0 | 0 | 1 |
| OUTPUTS FROM SEL 22, 23 | TAR1 | TAR2 | TAR2 |
| IR 13 | FOUR INSTRUCTIONS NEXT TO BR2 | FOUR INSTRUCTIONS NEXT TO BR2 | FOUR INSTRUCTIONS NEXT TO BR2 |
| BRIR 14 | — | FOUR INSTRUCTIONS STARTING AT MP | FOUR INSTRUCTIONS STARTING AT DV |
| OUTPUT FROM SEL 15 | IR 13 | IR 13 | BRIR 14 |

FIG. 7

| CYCLE | T1 | T2 |
|---|---|---|
| OUTPUT FROM REGISTER 31 | 0000 | 0000 |
| C1 | 0 | 0 |
| C0 | 00 | 00 |
| FC1 | — | 0 |
| FC0 | — | 00 |
| END | 1 | 1 (→0) |
| TM (PR) | 0 | 1 |
| S | 0 | 0 |
| OUTPUTS FROM SEL 22,23 | INC 21 | INC 21 |
| IR 13 | FOUR INSTRUCTIONS NEXT TO BR2 | FOUR INSTRUCTIONS NEXT TO BR2 |
| BRIR 14 | — | — |
| OUTPUT FROM SEL 15 | IR 13 | IR 13 |

FIG. 8

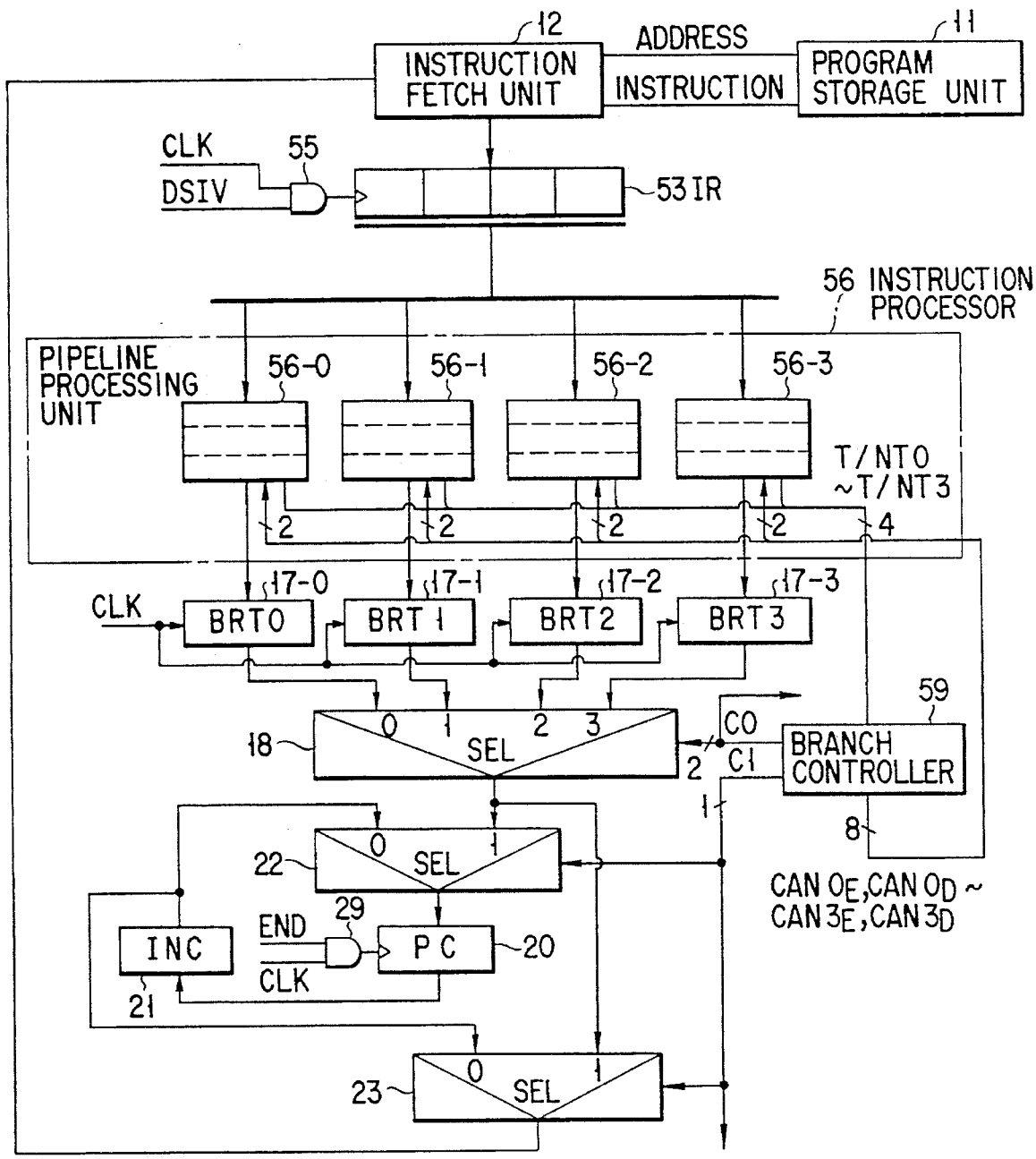
F I G. 9

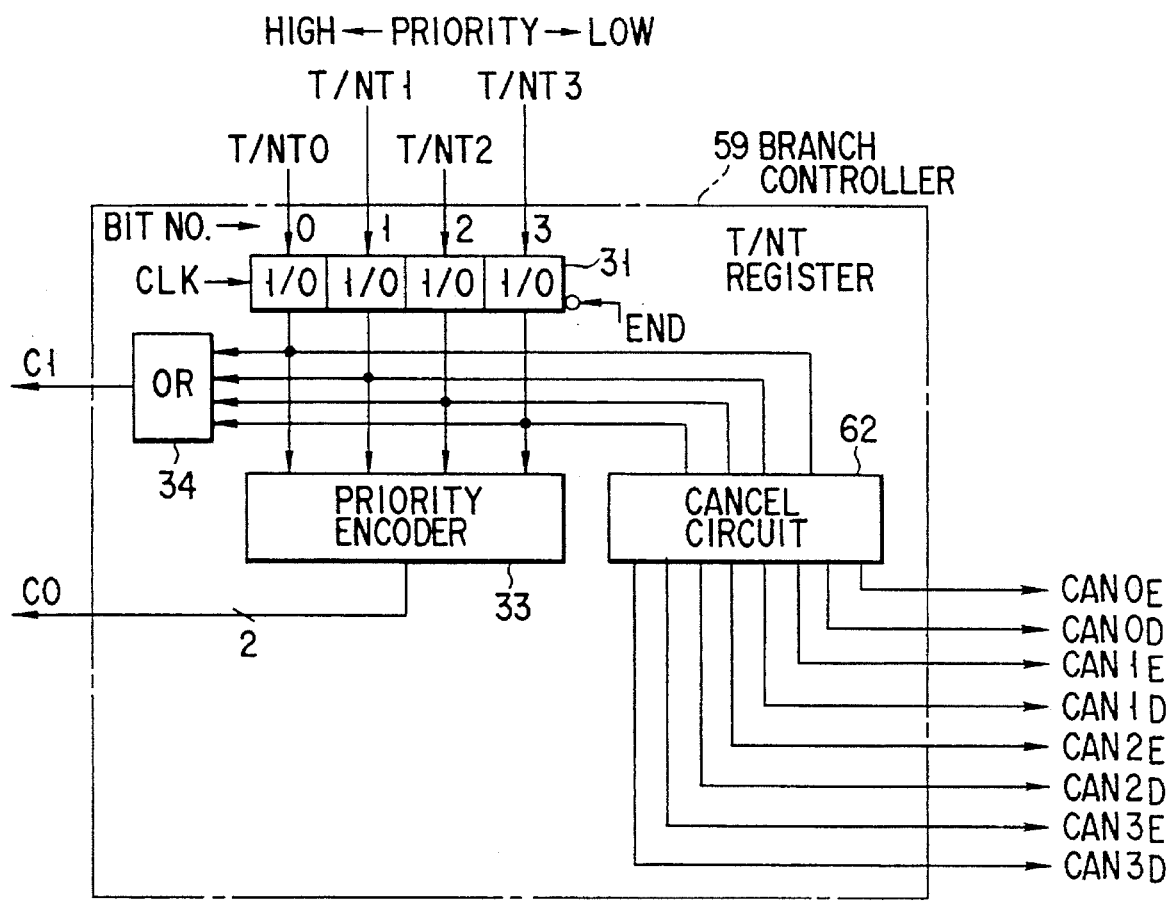
F I G. 10

| OUTPUT FROM REGISTER 31 | CAN0E | CAN1E | CAN2E | CAN3E | CAN0D | CAN1D | CAN2D | CAN3D |
|---|---|---|---|---|---|---|---|---|
| 0 0 0 0 | 0 | 0 | 0 | 0 | 0 | 0 | 0 | 0 |
| 0 0 0 1 | 0 | 0 | 0 | 0 | 1 | 1 | 1 | 1 |
| 0 0 1 0 | 0 | 0 | 0 | 1 | 1 | 1 | 1 | 1 |
| 0 0 1 1 | 0 | 0 | 0 | 1 | 1 | 1 | 1 | 1 |
| 0 1 0 0 | 0 | 0 | 1 | 1 | 1 | 1 | 1 | 1 |
| 0 1 0 1 | 0 | 0 | 1 | 1 | 1 | 1 | 1 | 1 |
| 0 1 1 0 | 0 | 0 | 1 | 1 | 1 | 1 | 1 | 1 |
| 0 1 1 1 | 0 | 0 | 1 | 1 | 1 | 1 | 1 | 1 |
| 1 0 0 0 | 0 | 1 | 1 | 1 | 1 | 1 | 1 | 1 |
| 1 0 0 1 | 0 | 1 | 1 | 1 | 1 | 1 | 1 | 1 |
| 1 0 1 0 | 0 | 1 | 1 | 1 | 1 | 1 | 1 | 1 |
| 1 0 1 1 | 0 | 1 | 1 | 1 | 1 | 1 | 1 | 1 |
| 1 1 0 0 | 0 | 1 | 1 | 1 | 1 | 1 | 1 | 1 |
| 1 1 0 1 | 0 | 1 | 1 | 1 | 1 | 1 | 1 | 1 |
| 1 1 1 0 | 0 | 1 | 1 | 1 | 1 | 1 | 1 | 1 |
| 1 1 1 1 | 0 | 1 | 1 | 1 | 1 | 1 | 1 | 1 |
F I G. 11
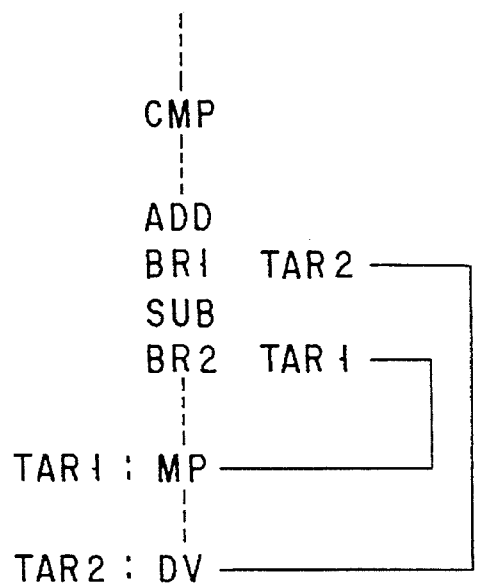
F I G. 12

PARALLEL PROCESSING APPARATUS SUITABLE FOR EXECUTING IN PARALLEL A PLURALITY OF INSTRUCTIONS INCLUDING AT LEAST TWO BRANCH INSTRUCTIONS

FIELD OF THE INVENTION

The present invention relates to a parallel processing apparatus comprising an instruction processor for parallelly executing a plurality of instructions and, more particularly, to a parallel processing apparatus suitable for a case wherein a plurality of instructions including at least two branch instructions are parallelly executed.

BACKGROUND ART

In recent years, a processing apparatus, which comprises an instruction processor having n pipeline processing units (n is an integer equal to or larger than 2) for processing instructions has been disclosed. This processing apparatus is called a parallel processing apparatus since it fetches n instructions at a time from an instruction stream of one load module, and parallelly executes-these instructions in the pipeline processing units in the instruction processor. In a parallel processing apparatus of this type, to continuously process n instructions at a time is important to improve its performance. Therefore, when a program is (locally) constituted by instructions independent from each other, the highest processing performance can be obtained.

The most serious problem may arise in parallel execution of instructions in the above-mentioned parallel processing apparatus, if these instructions include branch instructions. For example, assume a case wherein four instructions, i.e., ADD (addition), BR1 (conditional branch), SUB (subtraction), and BR2 (conditional branch) are parallelly executed. It is also assumed that these four instructions are arranged in the order of ADD, BR1, SUB, and BR2 in the program, as shown in FIG. 12. With this arrangement of the instructions, a sequential processing apparatus executes these instructions in the order of ADD →BR1 →SUB →BR2. This sequential execution order is handled as priority of the instructions in the parallel processing apparatus. In this description, assume that the BR1 instruction uses a result Of the ADD instruction as a branch condition, and the BR2 instruction uses a result of a CMP (comparison) instruction executed prior to the ADD instruction as a branch condition.

Since the above-mentioned four instructions include the two branch instructions, i.e., BR1 and BR2, four instructions to be executed next (next instruction string) depend on the results of BR1 and BR2. As possible next instruction strings, the following three cases are available.

(1) When branch condition of BR1 does not hold true, and branch condition of BR2 holds true:

In this case, the next instruction string includes four instructions starting at an MP (multiplication) instruction at a branch target address TAR1 designated by the BR2 instruction, as shown in FIG. 12.

(2) When branch condition of BR1-holds true:

In this case, the next instruction string includes four instructions starting at a DV (division) instruction at a branch target address TAR2 designated by the BR1 instruction, as shown in FIG. 12. Therefore, execution of the SUB and BR2 instructions after the BR1 instruction must be canceled.

(3) When branch conditions of neither BR1 nor BR2 hold true:

In this case, the next instruction string includes four instructions following the BR2 instruction.

As exemplified above, in the parallel processing apparatus, there are various cases of next instruction string fetch processing depending on combinations of true/not-true results of branch instructions when a single execution step includes a plurality of branch instructions. The next instruction string can only be determined after branch judgment processing of all the plurality of branch instructions is completed.

For this reason, the conventional parallel processing apparatus waits for completion of branch judgment processing of all the branch instructions to be parallelly executed and, thereafter, checks the branch judgment results and the priority levels of the branch instructions so as to determine the next instruction string, and then fetches the next instruction string. However, since it is troublesome to check the branch judgment results and priority levels of all the branch instructions to be parallel executed, and the next instruction string cannot be fetched unless the checking operation is performed, it is difficult to realize high-speed processing.

In order to allow-the parallel processing apparatus to easily fetch the next instruction string, it is also known to employ one of the following two schemes.

The first scheme is to statically constitute a program itself by a compiler, so as not to include a plurality of branch instructions to be executed in a single step. With this first scheme, for example, when four instructions are ADD, BR1, SUB, and BR2, as described above, an NOP (no operation) instruction is set in place of the second instruction BR2 (i.e., having a lower priority) of the two branch instructions. BR2 is set at the beginning of the next four instructions.

According to the first scheme, since the number of branch instructions to be executed in a single step is limited to one, the next instruction string to be fetched when a branch condition holds true can be easily determined, and can be quickly fetched. However, the first scheme disturbs high-speed processing since an extra NOP instruction is inserted, and the program becomes redundant.

The second scheme is to sequentially execute branch instructions in a step if there are a plurality of branch instructions to be executed in a single step. According to the second scheme, since the number of branch instructions to be simultaneously executed in a single step is limited to one, the next instruction string can be easily determined like in the first scheme. However, the second scheme cannot execute true parallel processing, and disturbs high-speed processing since the branch instructions are sequentially executed in a single step. Note that in the second scheme, when a branch condition of a branch instruction, executed first in a single step, holds true, a branch instruction having a lower priority is not executed, as a matter of course.

As described above, in the conventional parallel processing apparatus, which permits parallel execution of a plurality of branch instructions, next instruction string fetch processing is complex and is delayed, thus disturbing high-speed processing. In another conventional processing apparatus, which statically constitutes a program itself so as not to include a plurality of branch instructions in a single execution step, or sequentially executes a plurality of branch instructions in a single step, although next instruction fetch processing can be simplified, an NOP (no operation) instruction must be undesirably inserted, or parallel processing performance is impaired due to sequential execution of

SUMMARY OF THE INVENTION

It is, therefore, an object of the present invention to provide a parallel processing apparatus, which can parallelly execute a plurality of branch instructions, and can easily perform branch processing when a branch condition holds true at a high speed.

A parallel processing apparatus according to the present invention comprises an instruction processor having processing units corresponding in number to a plurality of instructions so as to parallelly execute the plurality of instructions, prefetch means for, when the instruction processor parallelly executes a plurality of instructions including at least one branch instruction, prefetching, as an instruction string to be executed next, a plurality of instructions starting at an instruction at a branch target designated by a branch instruction, which has a highest priority determined by an order of arrangement on a program, of branch instructions, whose branch conditions are determined earliest to hold true, and cancel means for canceling execution of instructions after the branch instruction, which has the highest priority, of the branch instructions, whose branch conditions are determined to hold true.

According to the above arrangement, a plurality of instructions including two or more branch instructions can be parallelly processed by the instruction processor. When the first branch condition is determined to hold true in the processing of the instruction processor, a plurality of instructions starting at an instruction at a branch target designated by a branch instruction whose branch condition holds true (a branch instruction having the highest priority, i.e., a branch instruction having the earliest execution order on a program when branch conditions of a plurality of branch instructions are simultaneously determined to hold true) are prefetched by the prefetch means as an instruction string (next instruction string) to be executed next. Therefore, when all the branch conditions of branch instructions having a higher priority than this branch instruction are determined not to hold true in branch judgment later, the prefetched instruction string is loaded in the instruction processor, and can be immediately executed, thus achieving high-speed branch processing.

According to the above arrangement, when a branch condition of a branch instruction having a higher priority than the branch instruction used in prefetch processing is determined to hold true later, since a plurality of instructions can be parallelly executed although high-speed branch processing cannot be performed as compared to the above-mentioned case, processing can be performed at a higher speed than conventional sequential execution.

Furthermore, according to the above arrangement, when a branch condition is determined to hold true, execution of instructions after the branch instruction having the highest priority of the branch instructions, whose branch conditions are determined to hold true, is canceled by the cancel means. Therefore, the drawback caused when parallel execution of a plurality of branch instructions is allowed can be prevented.

BRIEF DESCRIPTION OF DRAWINGS

FIG. 1 is a block diagram of a parallel processing apparatus according to the first embodiment of the present invention;

FIG. 6 is a table for explaining states in units of cycles in the respective sections of the apparatus when a branch condition of a BR1 instruction does not hold true, and a branch condition of a BR2 instruction holds true upon execution of the instructions shown in FIG. 5;

FIG. 7 is a table for explaining states in units of cycles in the respective sections of the apparatus when the branch condition of the BR1 instruction holds true upon execution of the instructions shown in FIG. 5;

FIG. 8 is a table for explaining states in units of cycles in the respective sections of the apparatus when branch conditions of neither BR1 nor BR2 instructions hold true upon execution of the instructions shown in FIG. 5;

FIG. 9 is a block diagram of a parallel processing apparatus according to the second embodiment of the present invention;

FIG. 10 is a diagram showing an internal arrangement of a branch controller 59 shown in FIG. 9;

FIG. 11 is a table showing the relationship between inputs and outputs of a cancel circuit 62 shown in FIG. 10; and FIG. 12 is a chart showing an example of a program including branch instructions.

DESCRIPTION OF THE PREFERRED EMBODIMENTS

Figures 2, 3:
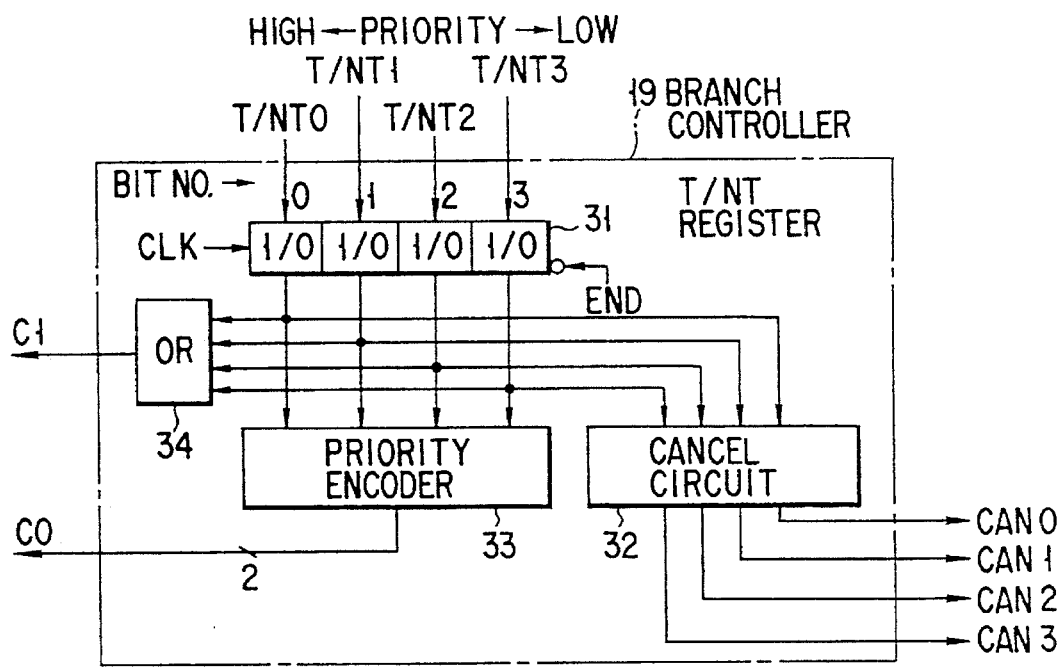
FIG. 2 is a diagram showing an internal arrangement of a branch controller 19 shown in FIG. 1.
FIG. 3 is a table showing the relationship between inputs and outputs of a cancel circuit 32 shown in FIG. 2.

The present invention will be described in detail hereinafter with reference to the accompanying drawings.

FIG. 1 shows the block arrangement of a parallel processing apparatus according to the first embodiment of the present invention.

In FIG. 1, a program storage unit 11 such as a main memory for storing various programs is connected to an instruction fetch unit 12. The instruction fetch unit 12 extracts (fetches) a plurality of instructions, e.g., four instructions, to be parallelly executed by an instruction processor 16 from the program storage unit 11 for each cycle on the basis of an address selected by a selector 23 (to be described later). Note that the instruction fetch unit 12 may include a register for holding the address used for fetching instructions from the program storage unit 11, and when the content of the register is equal to an address selected by the selector 23, instruction fetch processing may be omitted.

The instruction fetch unit 12 is connected commonly to the inputs of an instruction register (IR) 13 for holding four instructions fetched by the unit 12 in a normal state, and a branch target instruction register (BRIR) 14 for holding four instructions fetched by the unit 12 when a branch condition holds true. The outputs from the instruction register 13 and the branch target instruction register 14 are connected to the inputs of a 2-input/1-output selector (SEL) 15. The selector 15 selects one of the outputs from the instruction register 13 and the branch target instruction register 14 as an instruction string (four instructions) to be executed next according to a selection signal S output from a selector controller 25 (to be described later).

The output from the selector 15 is connected to an instruction processor 16 for parallelly executing the instruction string selected by the selector 15. The instruction processor 16 is constituted by pipeline processing units 16-0, 16-1, 16-2, and 16-3 for respectively executing the first, second, third, and fourth instructions of the instruction string (four instructions) selected by the selector 15 in a pipeline manner. In this embodiment, four instructions to be parallelly processed by the instruction processor 16 are one processing unit, and the processing of the next four instructions will not be started until all the processing operations of the four instructions are completed. Processing of new four instructions in the pipeline processing units 16-0 to 16-3 in the instruction processor 16 can be started when a pipeline ready signal PR (to be described later) goes to logic "1".

Each of the pipeline processing units 16-0 to 16-3 executes an instruction by three pipeline stages, i.e., a decode stage D for decoding an instruction, an execution stage E for performing an address calculation, an operand fetch operation, an arithmetic operation, and the like, and a write stage W for writing an execution result of instruction processing in the execution stage E in a register, a memory, or the like. When each of the pipeline processing units 16-0 to 16-3 determines in the execution process of the branch instruction in the execution stage E that the branch condition holds true, it outputs a corresponding one of branch true/ not-true signals T/NT0 to T/NT3 of logic "1" until the next instruction processing is enabled. Each of the pipeline processing units 16-0 to 16-3 outputs a corresponding one of end signals E0 to E3 of logic "1" until the next instruction processing is enabled when its own execution stage E is ended.

The pipeline processing units 16-0 to 16-3 are respectively connected to branch target address registers (BRT0 to BRT3) 17-0 to 17-3 for holding branch target addresses, generated when branch instructions are executed in the units 16-0 to 16-3, according to a system clock signal CLK. The outputs from the branch target address registers 17-0 to 17-3 are connected to the inputs of a 4-input/1-output selector (SEL) 15. The selector 18 selects one of the outputs (branch target addresses) from the branch target address registers 17-0 to 17-3 according to a 2-bit branch target address control signal C0 output from a branch controller 19 for performing branch control.

The branch controller 19 stores the states of branch true/not-true signals T/NT0 to T/NT3 output from the pipeline processing units 16-0 to 16-3, and outputs the 2-bit branch target address control signal C0, a 1-bit branch target address control signal C1, and four 1-bit cancel signals CAN0 to CAN3 according to its storage contents. The branch target address control signal C0 is used for controlling, e.g., the selector 18. The branch target address control signal C1 is used for controlling, e.g., selectors 22 and 23 (to be described later). The cancel signals CAN0 to CAN3 are used for canceling execution of instructions in the pipeline processing units 16-0 to 16-3.

In FIG. 1, the output from a program counter (PC) 20 for setting an address of the start instruction of the executing instruction string (four instructions) is connected to the input of an incrementor (INC) 21. The incrementor 21 adds a predetermined increment (for four instructions in this embodiment) to the output from the program counter 20, thereby generating an address (next instruction address) of the start instruction of the following instruction string.

The output from the incrementor 21 is connected to the input of the 2-input/1-output selector (SEL) 22 together with the output from the selector 18. The selector 22 selects one of the outputs from the incrementor 21 and the selector 18 according to the branch target address control signal C1 output from the branch controller 19, and outputs the selected output to the program counter 20.

The outputs from the incrementor 21 and the selector 18 are also connected to the inputs of the 2-input/1-output (SEL) 23. The selector 23 selects one of the outputs from the incrementor 21 and the selector 18 according to the branch target address control signal C1 output from the branch controller 19, and outputs the selected output to the instruction fetch unit 12. The selector 23 may be replaced by the unit 22 when the output from the selector 22 is connected to the instruction fetch unit 12 in addition to the program counter 20.

The end signals E0 to E3 output from the pipeline processing units 16-0 to 16-3 are connected to the inputs of an AND gate 24 so as to be logically ANDed. When all the end signals E0 to E3 are at logic "1", the AND gate 24 outputs an end signal END indicating the end of parallel execution processing (execution stages E) of four instructions in the instruction processor 16. The end signal END is connected to the selector controller 25 together with the system clock signal CLK and the branch target address control signals C0 and C1 output from the branch controller 19. The selector controller 25 generates the selection signal S and the pipeline ready signal PR on the basis of the signals END, C0, C1, and CLK.

The branch target address control signal C1 output from the branch controller 19 is also connected to the input of an inverter 26. The output from the inverter 26 is connected to the input of an AND gate 27 for controlling the load operation of the instruction register 13, together with the system clock signal CLK. The branch target address control signal C1 is connected to the input of an AND gate 28 for controlling the load operation of the branch target instruction register 14, together with the system clock signal CLK. The end signal END output from the AND gate 24 is connected to the input of an AND gate 29 for controlling the load operation of the program counter 20, together with the system clock signal CLK.

FIG. 2 shows the internal arrangement of the branch controller 19 in FIG. 1.

In FIG. 2, the branch controller 19 comprises a 4-bit register (T/NT register) 31 for holding the states of the branch true/not-true signals T/NT0 to T/NT3 output from the pipeline processing units 16-0 to 16-3 shown in FIG. 1 in bits 0 to 3 according to the system clock signal CLK, and a cancel circuit 32 for generating the cancel signals CAN0 to CAN3 for canceling execution of the pipeline processing units 16-0 to 16-3 on the basis of the output from the T/NT register 31. The cancel circuit 32 comprises, e.g., a decoder, and the relationship between its inputs (outputs from the T/NT register 31) and outputs (cancel signals CAN0 to CAN3) is as shown in FIG. 3.

The branch controller 19 further comprises a 4-input/2-output priority encoder 33, and an OR gate (OR) 34 for logically ORing the 4-bit output from the T/NT register 31, and outputting the OR signal as the branch target address control signal C1. The priority encoder 33 receives the 4-bit output of bit 0 to bit 3 (corresponding to the pipeline processing units 16-0 to 16-3) of the T/NT register 31, detects the position of a bit having the highest priority (a priority becomes higher toward the left side) of bits having values "1", and outputs the bit position information as the branch target address control signal C0 (2 bits).

Figures 4, 5:
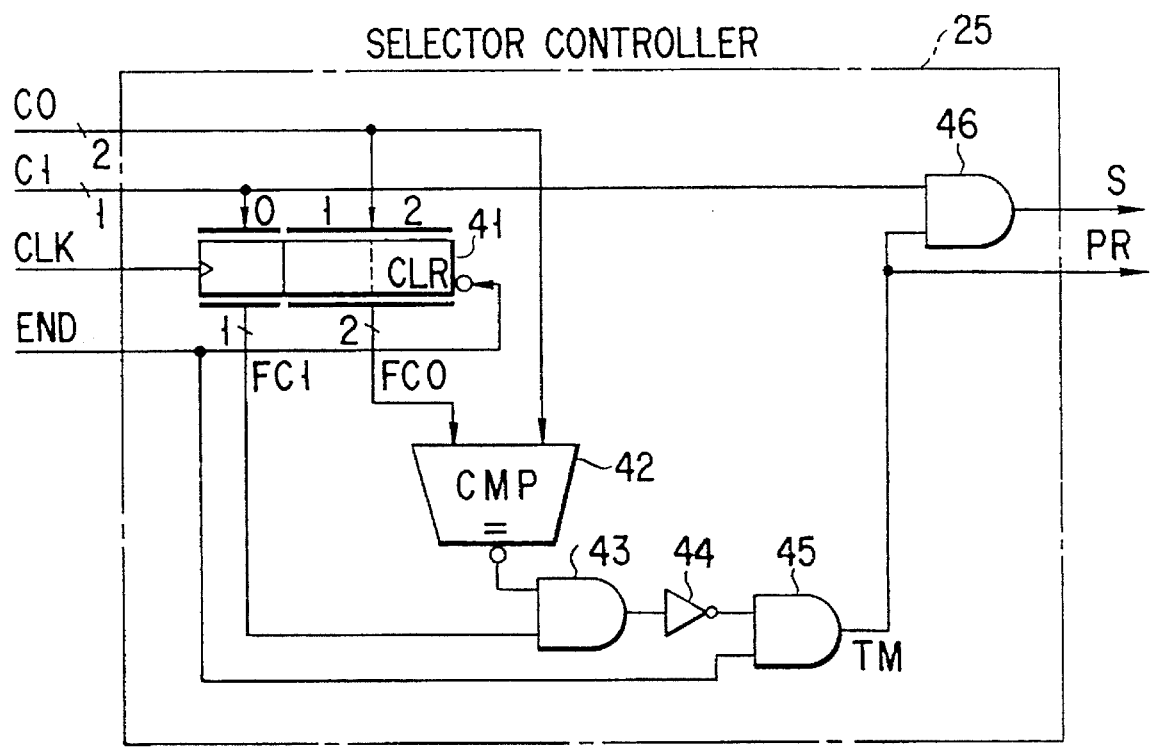
FIG. 4 is a diagram showing an internal arrangement of a selector controller 25 shown in FIG. 1.
FIG. 5 is a table showing an example of an instruction execution order in the first embodiment.

FIG. 4 shows the internal arrangement of the selector controller 25 in FIG. 1.

In FIG. 4, the selector controller 25 comprises a 3-bit register 41 for holding the 1-bit branch target address control signal C1 output from the branch controller 19 shown in FIG. 1 at the position of bit 0, and for holding the 2-bit branch target address control signal C0 at the positions of bits 1 and 2. The register 41 is cleared in response to the end signal END output from the AND gate 24 shown in FIG. 1.

The selector controller 25 comprises a comparator (CMP) 42 for comparing an output FC0 of bits 1 and 2 of the register 41 with the branch target address control signal C0, for, when FC0=C0, outputting a signal of logic "0", and for, when FC0≠C0, outputting a signal of logic "1", an AND gate 43 for logically ANDing the output from the comparator 42 with an output of bit 0 of the register 41, an inverter 44 for receiving the output from the AND gate 43, and inverting its level, and an AND gate 45 for logically ANDing the output from the inverter 44 and the end signal END. The AND gate 45 outputs a timing signal TM of logic "1" indicating that four instructions to be executed next by the instruction processor 16 shown in FIG. 1 are prepared in the instruction register 13 or the branch target instruction register 14 when an AND condition is satisfied. The timing signal TM is used as the pipeline ready signal PR indicating that the instruction processor 16 is ready to start execution of the new instruction string.

The selector controller 25 further comprises an AND gate 46 for logically ANDing the timing signal TM output from the AND gate 45 and the branch target address control signal C1. when the instruction processor 16 is ready to start execution of the new instruction string, the AND gate 46 outputs a signal indicating in which one of the instruction register 13 and the branch target instruction register 14 the four instructions to be executed next are prepared. The output signal from the AND gate 46 is used as the selection signal S for controlling the selector 15 shown in FIG. 1.

The operation of the parallel processing apparatus with the above-mentioned arrangement will be described below. In this embodiment, all the branch instructions included in four instructions to be subjected to parallel processing in the instruction processor 16 are restricted such that they have branch targets outside the four instructions. However, this restriction is imposed to simplify the description, and does not limit the application range of the present invention.

Assume that four instructions are fetched by the instruction processor 16, and the first, second, third, and fourth instructions are respectively and parallelly processed by the pipeline processing units 16-0, 16-1, 16-2, and 16-3. Note that instructions parallelly processed by the instruction processor 16 are assumed to be four instructions ADD, BR1, SUB, and BR2 in a program shown in FIG. 12 like in a case described in the section of background art. These four instructions have no dependency associated with operands. In addition, as described above, the BR1 instruction uses the result of the ADD instruction to be processed parallel thereto as a branch condition, and the BR2 instruction uses the result of an already executed CMP instruction as a branch condition.

In this case, the four instructions (i.e., the execution stages E thereof) are executed, as shown in FIG. 5. More specifically, three instructions ADD, SUB, and BR2 having no dependency from each other, are executed in a cycle T0, and the BR1 instruction using the result of the ADD instruction as a branch condition is executed in the next cycle T1. If the BR2 instruction uses the result of the immediately preceding SUB instruction as a branch condition, the BR2 instruction is executed in the cycle T1 like the BR1 instruction.

Assuming that the above four instructions are executed, as shown in FIG. 5, the possible next instruction strings are the following three cases, i.e., (1) a case wherein the branch condition of BR1 does not hold true, and the branch condition of BR2 holds true, (2) a case wherein the branch condition of BR1 holds true, and (3) a case wherein the branch conditions of neither BR1 nor BR2 hold true, as has been described in the section of background art. The operations of the above cases (1) to (3) in units of cycles will be described below in turn with reference to FIGS. 6 to 8.

(1) When branch condition of BR1 does not hold true, and branch condition of BR2 holds true:

(1-1) Cycle T0

In the cycle T0, the pipeline processing units 16-0, 16-2, and 16-3 of the instruction processor 16 execute processing operations (execution stages E) of ADD, SUB, and BR2, as shown in FIG. 5. Thus, the pipeline processing units 16-0 and 16-2 generate processing results of ADD and SUB. The pipeline processing unit 16-3 generates a branch target address designated by BR2. This branch target address is a branch target address TAR1 indicating an MP instruction, as can be seen from FIG. 12.

The branch target address TAR1 generated by the pipeline processing unit 16-3 is loaded in the branch target address register (BRT3) 17-3. The pipeline processing unit 16-3 determines that the branch condition holds true, and generates the branch true/not-true signal T/NT of logic "1". The branch true/not-true signal T/NT of logic "1" is latched at the end of the cycle T0 at the corresponding bit position (bit 3) of the T/NT register 31 in the branch controller 19.

Address load operations from the pipeline processing units 16-0 and 16-2, which are processing ADD and SUB, to the branch target address registers 17-0 and 17-2 are not performed since ADD and SUB are not branch instructions but normal instructions. Both the branch true/not-true signals T/NT0 and T/NT2 output from the pipeline processing units 16-0 and 16-2 are Furthermore, the branch true/not-true signal T/NT1 output from the pipeline processing unit 16-1, which does not perform execution of BR1, is also "0". Therefore, the content of bits 0 to 3 of the T/NT register 31 for storing the presence/absence of true branch conditions in the pipeline processing units 16-0 to 16-3 becomes "0001" at the end of the cycle T0.

(1-2) Cycle T1

In the cycle T1, the pipeline processing unit 16-1 of the instruction processor 16 executes processing of BR1 using the result of ADD processing of the pipeline processing unit 16-0 as a branch condition. In this case, since the branch condition of BR1 does not hold true, the branch true/not-true signal T/NT1 output from the pipeline processing unit 16-1 becomes "0".

Meanwhile, in the branch controller 19, a control necessary for prefetching four instructions including a branch target instruction as the first instruction is performed according to the value "0001" latched by the T/NT register 31. The 4-bit output from the T/NT register 31 is supplied to the priority encoder 33. The priority encoder 33 encodes the 4-bit output from the T/NT register 31, and outputs 2-bit information indicating the position of a bit which has the highest priority (leftmost bit) of all "1" bits, as the branch target address control signal C0. Therefore, when the output from the T/NT register 31 is "0001", the branch target address control signal C0 becomes 2-bit information indicating the position of bit 3 corresponding to the pipeline processing unit 16-3, i.e., "11".

The 4-bit output from the T/NT register 31 is also supplied to the OR gate 34 in the branch controller 19. The OR gate 34 outputs the branch target address control signal C1 of logic "1" as long as at least one bit of he 4-bit output from the T/NT register 31 is "1", i.e., if at least one of the pipeline processing units 16-0 to 16-3 determines in the preceding cycle (T0) that a branch condition holds true. In this case, since the pipeline processing unit 16-3 determines in T0 that the branch condition holds true, and bit 3 of the T/NT register 31 is at logic "1", the branch target address control signal C1 goes to "1".

The 2-bit branch target address control signal C0 output from the branch controller 19 (i.e., the priority encoder 33 therein) is supplied to the selector 18. The selector 18 selects the content of a corresponding one of the branch target address registers 17-0, 17-1, 17-2, and 17-3 when the signal C0 is "00", "01", "10", or "11". In this case, since the signal C0 is "11", the content of the branch target address register 17-3, i.e., the branch target address (TAR1) (indicating the MP instruction) loaded in the branch target address register 17-3 in BR2 processing of the pipeline processing unit 16-3 in T0, is selected.

The branch target address control signal C1 output from the branch controller 19 (i.e., the OR gate 34 therein) is supplied to the selectors 22 and 23. The selectors 22 and 23 select the output from the incrementor 21 when the signal C1 is "0"; and select the output from the selector 18 when it is "1". Since the signal C1 is "1", the output from the selector 18, i.e., the branch target address (TAR1) (indicating the MP instruction) loaded in the branch target address register 17-3, is selected. The branch target address (TAR1) selected by the selectors 22 and 23 is supplied to the program counter (PC) 20, and the instruction fetch unit 12.

According to an address selected and output from the selector 23 each cycle, the instruction fetch unit 12 prefetches four instructions starting at an instruction designated by the address, from the program storage unit 11. Since the address selected and output from the selector 23 is the branch target address TAR1, four instructions starting at the MP instruction designated by the address TAR1 are prefetched. The four instructions prefetched by the instruction fetch unit 12 are output to the instruction register (IR) 13 and the branch target instruction register (BRIR) 14.

The instruction register 13 is load-controlled by the AND gate 27 at a timing of the clock signal CLK when the branch target address control signal C1 is "0". The branch target instruction register 14 is load-controlled by the AND gate 28 at a timing of the clock signal CLK when the branch target address control signal C1 is "1". In this case, since the branch target address control signal C1 is "1", the four instructions (four instructions starting at the MP instruction) prefetched by the instruction fetch unit 12 are selectively loaded in the branch target instruction register 14 at the end of the cycle T1.

In the cycle T1, since BR1 processing is executed by the pipeline processing unit 16-1, all the processing operations (execution stages E) of the four instructions starting at ADD are ended. As a result, in the cycle T1, all the end signals E0 to E3 output from the pipeline processing units 16-0 to 16-3 are "1", and the AND gate 24 outputs the end signal END of logic "1".

The end signal END output from the AND gate 24 is input to the AND gate 29 together with the system clock signal CLK. The AND gate 29 enables the load operation of the program counter 20 at a timing of the system clock signal CLK when the end signal END is at logic "1". At this time, the input of the program counter 20 receives the branch target address TAR1 selected and output from the selector 22. For this reason, at the end of the cycle T1, the branch target address TAR1 selected and output from the selector 22 is loaded in the program counter 20. The content (address TAR1) of the program counter 20 indicates the start address of four instructions whose processing is started at the beginning of the next cycle T2, i.e., the start address of new four instructions starting at the MP instruction.

(1-3) Cycle T2

In the immediately preceding cycle T1, since it is determined in the BR1 processing of the pipeline processing unit 16-1 that the branch condition does not hold true, as described above, the branch true/not-true signal T/NT0 remains "0". Therefore, the branch true/not-true signals T/NT0 to T/NT3 at the end of the cycle T1 remain "0001" like that at the end of the cycle T0, and the content of the T/NT register 31 in the branch controller 19 remains "0001". Since the content "0001" of the T/NT register 31 is left unchanged, the branch target address control signals C1 and C0 are also "1" and "11" like that at the end of the cycle T0.

The 1-bit branch target address control signal C1 is latched at bit 0 of the register 41 in the selector controller 25 in response to the system clock signal CLK. At the same time, the 2-bit branch target address control signal C0 is latched at bits 1 and 2 of the register 41. C1 and C0 are respectively "1" and "11" in the cycle T1, as described above. Therefore, in the cycle T2, since the output FC1 of bit 0 of the register 41 is "1", and the output FC0 of bits 1 and 2 therefrom is "11". In addition, C1 and C0 in the cycle T2 are also respectively "1" and "11" like in the cycle T1.

The output FC0 of bits 1 and 2 of the register 41 is supplied to the comparator 42 together with the branch target address control signal C0. The comparator 42 compares FC0 and C0. If FC0 and C0 are equal to each other, i.e., if the value C0 in the current cycle is equal to the value C0 in the immediately preceding cycle, the comparator 42 outputs a signal of logic "0" since it determines that there are no branch instructions, which have a higher priority, and whose branch conditions newly hold true. In this cycle T2, since FC0 and C0 are "11" and are equal to each other, the comparator 42 outputs a signal of logic "0". In the cycle T2, the end signal END is at logic "1". For this reason, in the cycle T2, the AND gate 45 outputs the timing signal TM of logic "1".

The timing signal TM output from the AND gate 45 is supplied to the AND gate 46 together with the branch target address control signal C1. The AND gate 46 outputs the selection signal S of logic "1" only when both the signals TM and C1 are "1"; otherwise, the selection signal S of logic "0" is output. In this cycle T2, since both TM and C1 are "1", the selection signal S becomes "1".

when the selection signal S is "1", the selector 15 selects the content of the branch target instruction register 14, and outputs the selected content to the instruction processor 16. At the end of the immediately preceding cycle T1, the branch target instruction register 14 has already loaded the four instructions starting at the instruction MP stored at the branch target address TAR1 designated by BR2. Therefore, when the content of the branch target instruction register 14 is selected by the selector 15 in the cycle T2, the four instructions starting at the branch target instruction MP and prefetched by the instruction fetch unit 12 are quickly supplied to the instruction processor 16.

The timing signal TM of logic "1" output from the AND gate 45 in the cycle T2 is supplied to the instruction processor 16 as the pipeline ready signal PR. Thus, the instruction processor 16 fetches new instructions output from the selector 15, and starts processing thereof. In this case, the instructions fetched by the instruction processor 16 are four instructions starting at the branch target instruction MP, and the instruction processor 16 quickly processes these four instructions by the pipeline processing units 16-0 to 16-3 without a delay time. When the instruction processing units 16-0 to 16-3 start new instruction processing, the end signals E0 to E3 go to logic "0", and the end signal END also goes to logic "0". When the end signal END goes to "0", the contents of the registers 31 and 41 are cleared.

when a branch target instruction is not prefetched unlike in this embodiment, it is fetched in the cycle T2 after the end signal END is output, and a delay time of 1T is formed. If a plurality of branch instructions are not parallelly processed, processing is further delayed.

(2) when branch condition of BR1 holds true:

(2-1) Cycle T0

In the cycle T0, the same processing operations of ADD, SUB, and BR2 as in the case (1) wherein the branch condition of BR1 does not hold true, and the branch condition of BR2 holds true, are performed. If the branch condition of BR2 holds true, the content of the T/NT register 31 in the branch controller 19 at the end of the cycle T0 becomes "0001". The branch target address register 17-3 loads the branch target address TAR1 indicating the MP instruction.

(2-2) Cycle T1

In the cycle T1, the pipeline processing unit 16-1 of the instruction processor 16 performs processing of BR1, and generates a branch target address TAR2 indicating a DV instruction. In this case, since the branch condition of BR1 holds true, the branch true/not-true signal T/NT1 output from the pipeline processing unit 6-1 goes from "0" to "1". The branch target address (the branch target address TAR2 indicating the DV instruction) generated by the pipeline processing unit 16-1 (i.e., designated by BR1) is loaded in the branch target address register 17-1.

In the branch controller 19, control for prefetching a branch target instruction is performed according to the value "0001" latched in the T/NT register 31 in the same manner as in the above-mentioned case (1). In this case, since the branch target address control signal C0 is "11", and the branch target address control signal C1 is "1", the branch target address (TAR1) (indicating the MP instruction) loaded in the branch target address register 17-3 in the BR2 processing is selected by the selectors 18 and 23, and is output to the instruction fetch unit 12. Four instructions starting at the MP instruction stored at the address TAR1 are prefetched by the instruction fetch unit 12 from the program storage unit 11. These prefetched four instructions are loaded in the branch target instruction register 14 at the end of the cycle T1.

The branch true/not-true signals T/NT0 to T/NT3 at the end of the cycle T1 become "0101" unlike that at the end of the cycle T0. Therefore, the content of the T/NT register 31 in the branch controller 19 also becomes "0101".

(2-3) Cycle T2

In the cycle T2, since the branch condition of BR1 having a higher priority than BR2 holds true in the immediately preceding cycle T1, processing of four instructions starting at the branch target instruction (DV instruction) of BR1 is required. Since these four instructions are not yet fetched in the branch target instruction register 14, they are fetched in the branch target instruction register 14, as will be described below, and actual processing is started at the beginning of the next cycle T3.

In the cycle T2, the content of the T/NT register 31 in the branch controller 19 is "0101". For this reason, the branch controller 19 outputs the branch target address control signal C0 having a value "01" indicating bit 1 (i.e., the pipeline processing unit 16-1 corresponding thereto), and the branch target address control signal C1 of logic "1". Therefore, in the cycle T2, the selector 18 selects the content (the address TAR2 indicating the DV instruction) of the branch target address register 17-1, and the output from the selector 18 is further selected by the selector 23. As a result, the branch target address TAR2 designated by BR1 is output from the selector 23 to the instruction fetch unit 12.

The instruction fetch unit 12 fetches four instructions starting at the DV instruction stored at the address TAR2 from the program storage unit 11 according to the address TAR2 output from the selector 23. The four instructions starting at the DV instruction and fetched by the instruction fetch unit 12 are loaded in the branch target instruction register 14 at the end of the cycle T2 since the branch target address control signal C1 is "1". As a result, the content of the branch target instruction register 14 is rewritten from the four instructions starting at the MP instruction designated by BR2, whose branch condition is determined to hold true in the cycle T0, with the four instructions starting at the DV instruction designated by BR1 (having a higher priority than BR2), whose branch condition is determined to hold true in the cycle T1.

When a bit having the highest priority of bits with a value "1" is present among bit 0 to bit 2 in the T/NT register 31, the cancel circuit 32 in the branch controller 19 performs a control for canceling processing of the pipeline processing units 16-i corresponding to the next and subsequent bit positions. Therefore, when the content of the T/NT register 31 is "0101" like in this cycle T2, i.e., when the bit having the highest priority of bits with a value "1" is bit 1, the cancel circuit 32 outputs the cancel signals CAN2 and CAN3 of logic "1" so as to cancel SUB processing and BR2 processing of the pipeline processing units 16-2 and 16-3 corresponding to bits 2 and 3, as can be seen from FIG. 3. As a result, in the pipeline processing units 16-2 and 16-3, write operations (write-back operations to registers, memories, condition codes, and the like) of execution results of the corresponding instruction processing are inhibited.

In the cycle T2, the output FC1 of bit 0 of the register 41 in the selector controller 25 becomes "1" since C1 in the cycle T1 is "1". The output FC0 of bits 1 and 2 of the register 41 becomes "11" since C0 in the cycle T1 is "11". On the other hand, C1 and C0 in the cycle T2 are respectively "1" and "01", as described above.

The comparator 42 in the selector controller 25 compares FC0 and C0. In the cycle T2, FC0 is not equal to C0. In this case, the comparator 42 outputs a signal of logic "1". The output signal from the comparator 42 is supplied to the AND gate 43 together with the output FC1 of bit 0 of the register 41. when both the output from the comparator 42 and FC1 are "1", the AND gate 43 outputs a signal of logic "1". The signal of logic "1" output from the AND gate 43 indicates that it must be waited until four instructions starting at an instruction provided at the branch target are fetched in the current cycle (T2 in this case) since it is newly determined in the immediately preceding cycle (T1 in this case) that a branch condition of a branch instruction having a higher priority than a branch instruction, whose branch condition is determined to hold true in a cycle (T0 in this case) before the immediately preceding cycle, holds true. When the output from the AND gate 43 goes to "1", all the processing operations (execution stages E) of the four instructions starting at ADD are ended in the cycle T1, and even when the end signal END of logic "1" is output from the AND gate 24 after T1, the timing signal TM of logic "1", i.e., the pipeline ready signal PR, is prevented from being output from the AND gate 45.

(2-4) Cycle T3

At the end of the cycle T2, FC0 becomes equal to C0. In this case, the output from the comparator 42 goes to "0", and the output from the AND gate 43 also goes to "0". As a result, the AND condition of the AND gate 45 is satisfied, and the AND gate 45 outputs the timing signal TM of logic "1", i.e., the pipeline ready signal PR.

When the timing signal TM of logic "1" is output from the AND gate 45, since C1="1", the AND condition of the AND gate 46 is satisfied, and the AND gate 46 outputs the selection signal S of logic "1".

When the selection signal S is "1", the selector 15 selects the content of the branch target instruction register 14, and outputs the selected content to the instruction processor 16. In the branch target instruction register 14, the four instructions starting at the instruction DV stored at the branch target address TAR2 designated by BR1 have already been loaded at the end of the cycle T2. Therefore, in the cycle T3, when the content of the branch target instruction register 14 is selected by the selector 15, the four instructions starting at the branch target instruction DV are supplied to the instruction processor 16. At this time, the AND gate 45 outputs the timing signal TM of logic "1", i.e., the pipeline ready signal PR, and this signal is supplied to the instruction processor 16. As a result, the instruction processor 16 starts processing of the four instructions starting at the instruction DV. When the instruction processor 16 starts new instruction processing, the end signal END goes to logic "0", and the contents of the registers 31 and 41 are cleared. (3) When branch conditions of neither BR1 nor BR2 hold true:

(3-1) Cycle T0

In the cycle T0, the same processing operations of ADD, SUB, and BR2 as in the case (1) described above are performed. In this case, since the branch condition of BR2 does not hold true, the content of the T/NT register 31 in the branch controller 19 at the end of the cycle T0 becomes "0000".

(3-2) Cycle T1

In the cycle T1, the pipeline processing unit 16-1 of the instruction processor 16 performs processing of BR1. In this case, since the branch condition of BR1 does not hold true, the branch true/not-true signal T/NT1 output from the pipeline processing unit 16-1 remains "0".

In the branch controller 19, a control for prefetching four instructions at an instruction next to the BR2 instruction is performed according to the value "0000" latched in the T/NT register 31. More specifically, the branch controller 19 (i.e., the OR gate 34 therein) logically ORs the output "0000" from the T/NT register 31, and outputs an OR signal of logic "0" as the branch target address control signal C1 to the selectors 22 and 23. The selector 23 selects the output from the incrementor 21, i.e., an address (address of an instruction next to the BR2 instruction) obtained by adding a predetermined increment for four instructions to the content of the program counter 20, according to the branch target address control signal C1 of logic "0", and outputs the selected address to the instruction fetch unit 12. According to the address (next instruction address) selected and output from the selector 23, the instruction fetch unit 12 prefetches the four instructions starting at the instruction (the instruction next to BR2) stored at that address from the program storage unit 11. These prefetched four instructions are loaded in the instruction register 13 at the end of the cycle T1 since the branch target address control signal C1 is "0".

Note that the branch true/not-true signals T/NT0 to T/NT3 at the end of the cycle T1 are "0000" like that at the end of the cycle T0. Therefore, the content of the T/NT register 31 in the branch controller 19 also remains "0000".

(3-3) Cycle T2

In the above-mentioned cycle T1, all the processing operations (execution stages E) of the four instructions starting at ADD end, and the end signal END goes to "1". Thus, at the end of the cycle T1, the load operation of the program counter 20 is enabled. At this time, since the content of the T/NT register 31 in the branch controller 19 is "0000", the branch target address control signal C1 output from the branch controller 19 is "0". Therefore, the selector 22 selects the output from the incrementor 21, i.e., the address of the instruction next to the BR2 instruction, and the selected address is loaded in the program counter 20.

In the cycle T2, the output FC1 of bit 0 of the register 41 in the selector controller 25 is "0" since C1 in the cycle T1 is "0". At this time, %he end signal END is "1". Therefore, in the cycle T2, the AND gate 45 outputs the timing signal TM of logic "1".

The timing signal TM output from the AND gate 46 is supplied to the AND gate 46 together with the branch target address control signal C1. The AND gate 46 keeps outputting the selection signal of logic "0" independently of the timing signal TM since the signal C1 is "0". As a result, the selector 15 selects the content of the instruction register 13, and outputs the selected content to the instruction processor 16. In the instruction register 13, the four instructions starting at the instruction next to BR2 have already been loaded at the end of the immediately preceding cycle T1. Therefore, when the timing signal TM of logic "1" output from the AND gate 45 is supplied to the instruction processor 16 (i.e., the pipeline processing units 16-0 to 16-3 therein) as the pipeline ready signal PR, processing of the four instructions starting at the instruction next to BR2 and prefetched by the instruction fetch unit 12 is started by the instruction processor 16.

In the description of the parallel processing apparatus according to the above-mentioned first embodiment, four instructions to be parallelly processed by the instruction processor 16 serve as one processing unit, and processing of the next four instructions will not be started unless execution of all of the four instructions is ended. However, the present invention is not limited to this. For example, when all of the four instructions enter the execution stages E, and all the decode stages D are ready, the processing of the following four instructions may be started. The embodiment of such a parallel processing apparatus will be described below with reference to the accompanying drawings.

FIG. 9 shows the block arrangement of a parallel arithmetic processing apparatus according to the second embodiment of the present invention.

In the arrangement shown in FIG. 9, a single instruction register (IR) 53 for holding four instructions fetched by an instruction fetch unit 12 is arranged in place of the two registers 13 and 14 shown in FIG. 1. The output from the instruction register 53 is connected to an instruction processor 56 for parallelly processing four instructions supplied from the register 53. The instruction processor 56 is constituted by pipeline processing units 56-0 to 56-3, each of which performs instruction processing by three stages, i.e., a decode stage D, an execution stage E, and a write stage W.

The instruction processor 56 executes processing of four new instructions supplied from the instruction register 53 in a pipeline manner without waiting for the end of four instructions in processing as long as the decode stages D become ready. In this respect, the instruction processor 56 is different from the instruction processor 16 shown in FIG. 1, and processing at higher speed processing can be performed as compared to the parallel processing apparatus shown in FIG. 1.

Branch target addresses generated when branch instructions are executed in the execution stages E of the pipeline processing units 56-0 to 56-3 are supplied to branch target address registers 17-0 to 17-3. When the pipeline processing units 56-0 to 56-3 determine in the execution step of branch instructions that branch conditions hold true, they output active branch true/not-true signals T/NT0 to T/NT3 of logic "1". The branch true/not-true signals T/NT0 to T/NT3 are supplied to a branch controller 59.

The branch controller 59 stores the states of the branch true/not-true signals T/NT0 to T/NT3 output from the pipeline processing units 56-0 to 56-3, and generates a 2-bit branch target address control signal C0, a 1-bit branch target address control signal C1, and six 1-bit cancel signals CAN0E to CAN3E, and CAN0D to CAN3D according to its storage content. The cancel signals CAN0E to CAN3E are used for canceling (invalidating) the results of the execution stages E of the pipeline processing units 16-0 to 16-3. The cancel signals CAN0D to CAN3D are used for canceling (invalidating) the results of the decode stages D of the pipeline processing units 16-0 to 16-3.

FIG. 10 shows the internal arrangement of the above-mentioned branch controller 59. As can be seen from FIG. 10, a difference in the branch controller 59 from the branch controller 19 shown in FIG. 1 is that a cancel circuit 62 for generating the cancel signals CAN0E to CAN3E and CAN0D to CAN3D is arranged in place of the cancel circuit 32. The cancel circuit 62 comprises, e.g., a decoder, and the relationship between its inputs (output from the T/NT register 31) and outputs (cancel signals CAN0E to CAN3E and CAN0D to CAN3D) is as shown in FIG. 11. FIG. 11 illustrates that when bits with a value "1" are present in the output from the T/NT register 31, cancel signals CANiE for canceling the execution stages E of the pipeline processing units 56-i corresponding to the bit positions after the position of a bit having the highest priority of the bits with the value "1" are set at logic "1", and furthermore, the cancel signals CAN0D to CAN3D for canceling the decode stages D of all the pipeline processing units 56-0 to 56-3 are set at logic "1".

The parallel processing apparatus shown in FIG. 9 is provided with an AND gate 55 for performing load control of the instruction register 53. The AND gate 55 receives a decode stage invalid signal DSIV output from a pipeline controller (not shown), and a system clock signal CLK, and enables the load operation of the instruction register 53 when its AND condition is satisfied. The signal DSIV is set at logic "1" when the decode stages D of all the pipeline processing units 56-0 to 56-3 are ready.

In the above arrangement, when the decode stages D of all the pipeline processing units 56-0 to 56-3 are ready, i.e., when the decode stage invalid signal DSIV is at logic "1", the AND gate 55 enables the load operation of the instruction register 53 at the timing of the system clock signal CLK. As a result, four instructions prefetched from a program storage unit 11 by the instruction fetch unit 12 are loaded in the instruction register 53 even when instructions in processing are present in the execution stages E and the following stages of the pipeline processing units 56-0 to 56-3. The four instructions loaded in the instruction register 53 are directly supplied to the instruction processor 56, and are processed in the decode stages D of the pipeline processing units 56-0 to 56-3. Note that the operation of the instruction fetch unit 12 is the same as that in the arrangement shown in FIG. 1.

The branch controller 59 generates the 2-bit branch target address control signal C0 and the 1-bit branch target address control signal C1 according to the 4-bit output from the T/NT register 31. The branch controller 59 causes the cancel circuit 62 in FIG. 10 to generate the cancel signals CAN0E to CAN3E and the cancel signals CAN0D to CAN3D according to the 4-bit output from the T/NT register 31.

Assume that the branch condition of BR2 is determined to hold true in a cycle T0, and the branch condition of BR1 is determined to hold true in a cycle T1 like in the case (2) of the first embodiment. In this case, in the cycle T1, the 4-bit output from the T/NT register 31 is "0001", the branch target address control signal C0 is "11", and the branch target control signal C1 is "1".

Therefore, in the cycle T1, the content (branch target address TAR1) of the branch target address register 17-3 is selected by a selector 18, and is further selected by a selector 23. The selected content is supplied to the instruction fetch unit 12. The instruction fetch unit 12 prefetches four instructions starting at an MP instruction at the branch target address TAR1 selected and output from the selector 23 from the program storage unit 11, and outputs the prefetched instructions to the instruction register 53. Thus, if the decode stages D of the pipeline processing units 56-0 to 56-3 are ready in the cycle T1, i.e., if DSIV=1, the four instructions starting at the MP instruction (i.e., four instructions at the branch target) are loaded in the instruction register 53 at the end of the cycle T1. The four instructions loaded in the instruction register 53 are supplied to the instruction processor 56, and are processed by the decode stage D in the next cycle T2.

If the branch condition of BR1 is determined to hold true in the cycle T1, the 4-bit output from the T/NT register 31 becomes "0101" and the branch target address control signal C0 becomes "01" in the next cycle T2. On the other hand, the branch target address control signal C1 remains "1".

Therefore, in the cycle T2, the content (branch target address TAR2) of the branch target address register 17-1 is selected by the selector 18, and is further selected by the selector 23. The selected content is supplied to the instruction fetch unit 12. The instruction fetch unit 12 fetches four instructions starting at a DV instruction at the branch target address TAR2 selected and output from the selector 23 from the program storage unit 11, and outputs the fetched instructions to the instruction register 53.

The cancel circuit 62 in the branch controller 59 outputs the cancel signals CAN2E and CAN3E of logic "1" for canceling the execution stages E of the pipeline processing units 16-2 and 16-3 corresponding to bits 2 and 3 after bit 1, and the cancel signals CAN0D to CAN3D of logic "1" for canceling the decode stages D of all the pipeline processing units 16-0 to 16-3 in the cycle T2 wherein the output from the T/NT register 31 becomes "0101", as can be seen from FIG. 11. Thus, in the cycle T2, the execution stages E of the instructions SUB and BR2 after BR1 having a higher priority of the two branch instructions BR1 and BR2, whose branch conditions hold true, are canceled. At the same time, since the branch condition of BR2 having a lower priority than BR1 is determined to hold true, the decode stages D of the four instructions starting at the MP instruction stored at the branch target address TAR1 and prefetched in the immediately preceding cycle T1 are canceled.

At the end of the cycle T2, the four instructions which start at the DV instruction stored the branch target designated by BR1, and which are fetched from the program storage unit 11 by the instruction fetch unit 12 in the cycle T2 are loaded in the instruction register 53. The four instructions loaded in the instruction register 53 are supplied to the instruction processor 56. Thus, processing of the four instructions starting at the DV instruction is started in the next cycle T3.

The embodiments described in detail in the specification and illustrated in the accompanying drawings do not limit the present invention. Various modifications within the gist of the present invention and the scope of the claims are deemed to be included in the present invention.

INDUSTRIAL APPLICABILITY

As described above, a parallel processing apparatus according to the present invention is particularly effective when a plurality of instructions including at least two branch instructions must be parallelly executed.

The invention claimed is:

1. A parallel processing apparatus, comprising:

an instruction processor having a plurality of processing units for parallel executing a plurality of instructions;

prefetch means for, when said instruction processor parallel executes said plurality of instructions including at least two branch instructions, prefetching, as an instruction string to be executed next, a plurality of instructions starting at an instruction stored at a branch target designated by a branch instruction having a highest priority, determined by an order of arrangement on a program, of the at least two branch instructions whose branch conditions are determined to hold true earliest, and for, when branch instructions whose branch conditions are determined to hold true later include a branch instruction having a higher priority than the branch instructions whose branch conditions are determined to hold true previously, prefetching a plurality of instructions starting at an instruction stored at a branch target designated by the branch instruction having the higher priority as the instruction string to be executed next again;

cancel means for canceling execution of the instructions after the branch instruction having the highest priority of the branch instructions whose branch conditions are determined to hold true;

branch judgment result holding means for holding branch judgment results in correspondence with each of said processing units and for holding said branch judgment results obtained when said processing units perform processing of said branch instructions, until parallel execution of all of said plurality of instructions including the branch instructions in said instruction processor is completed;

first detection means for detecting said processing unit, which processes a branch instruction having the highest priority of branch instructions whose branch conditions are determined to hold true, on the basis of the content held by said branch judgment result holding means;

second detection means for detecting, on the basis of the content held by said branch judgment result holding means, whether or not branch instructions whose branch conditions are determined to hold true are present; and address selection means for, when the detection result of said second detection means indicates that branch instructions whose branch conditions are determined to hold true are present, selecting a branch target address generated in branch instruction processing of the processing unit indicated by the detection result of said first detection means, and for, when the detection result of said second detection means indicates that branch instructions whose branch conditions are determined to hold true are not present, selecting a next instruction address for designating an instruction next to the plurality of instructions parallel executed by said instruction processor, and wherein when said first detection means detects a new processing unit, with said instruction processor parallel executing said plurality of instructions, said prefetch means prefetches the instruction string to be executed next on the basis of the address which is generated in branch instruction processing of said detected processing unit and is selected by said address selection means.

2. A parallel processing apparatus according to claim 1, wherein said cancel means detects the branch instruction having the highest priority of the branch instructions whose branch conditions are determined to hold true, on the basis of the content held by said branch judgment result holding means, generates cancel signals for canceling execution of the instructions after the detected branch instruction, and supplies the cancel signals to at least one of the plurality of processing units.

3. A parallel processing apparatus according to claim 1, wherein said first detection means comprises a priority encoder for receiving the branch judgment results held in said branch judgment result holding means in units of processing units, and generating position information for designating a corresponding processing unit on the basis of holding position of the branch judgment result of the branch instruction having the highest priority of the branch judgment results indicating that corresponding branch conditions hold true.

4. A parallel processing apparatus according to claim 3, wherein said second detection means comprises OR means for logically ORing the branch judgment results held in said branch judgment result holding means in units of processing units, and said cancel means comprises a decoder for receiving the branch judgment results held in said branch judgment result holding means in units of processing units, and generating cancel signals for cancelling execution of the instructions after the branch instruction having the highest priority of the branch instructions whose branch conditions are determined to hold true, on the basis of a holding position of the branch judgment result of the branch instruction having the highest priority of the branch judgement results indicating that corresponding branch conditions hold true.

5. A parallel processing apparatus according to claim 4, wherein said address selection means comprises first selection means for selecting, according to the position information output from said priority encoder, a branch target address generated in branch instruction processing of the processing unit indicated by the position information, and second selection means for selecting one of the branch target address selected by said first selection means, and a next instruction address for designating an instruction next to the plurality of instructions in execution according to the OR result from said OR means, and said address selection means supplies the address selected by said second selection means to said prefetch means.

\* \* \* \* \*